United States Patent [19]

Cobb, Jr.

[11] Patent Number: 5,393,425
[45] Date of Patent: Feb. 28, 1995

[54] IRRIGATION SYSTEM LATERAL PICKUP PIPE STRAINER

[76] Inventor: Clois R. Cobb, Jr., P.O. Box 337, Shallowater, Tex. 79363

[21] Appl. No.: 152,710

[22] Filed: Nov. 16, 1993

[51] Int. Cl.$^6$ ............................................. B01D 35/04
[52] U.S. Cl. ................................ 210/461; 210/497.01; 210/497.2; 210/498; 210/499
[58] Field of Search ............... 210/459, 460, 461, 462, 210/463, 497.01, 497.2, 498, 499

[56] References Cited

U.S. PATENT DOCUMENTS

| | | | |
|---|---|---|---|
| 1,981,262 | 11/1934 | Burt | 210/460 |
| 2,594,650 | 4/1952 | Huppertz | 210/98 |
| 2,907,466 | 10/1959 | Beddow | 210/457 |
| 3,163,229 | 12/1964 | Salisbury | 210/460 |
| 3,893,919 | 7/1975 | Flegel et al. | 210/166 |
| 4,052,315 | 10/1977 | Lindsay, Jr. et al. | 210/232 |
| 4,331,293 | 5/1982 | Rangel-Garza | 239/542 |
| 4,795,560 | 1/1989 | Chupka et al. | 210/497 |
| 5,054,690 | 10/1991 | Olson | 239/542 |

*Primary Examiner*—Robert A. Dawson
*Assistant Examiner*—W. L. Walker
*Attorney, Agent, or Firm*—Jacobson, Price, Holman & Stern

[57] ABSTRACT

An upstanding tubular strainer is provided including inlet and outlet end portions delimited by a longitudinally central radially outwardly projecting diametrically enlarged shoulder. The inlet end portion is provided with elongated, longitudinally extending and circumferentially spaced inlet slots which taper in width inwardly toward the interior of the tubular member and the outlet end portion includes tandem circumferentially extending seal structure spaced longitudinally therealong. The outlet end portion is adapted to be telescoped upwardly into the inlet end of a riser pipe or the like opening upwardly outwardly from the upper wall portion of a horizontal main supply pipe.

4 Claims, 1 Drawing Sheet

FIG. 1
FIG. 2
FIG. 3
FIG. 4
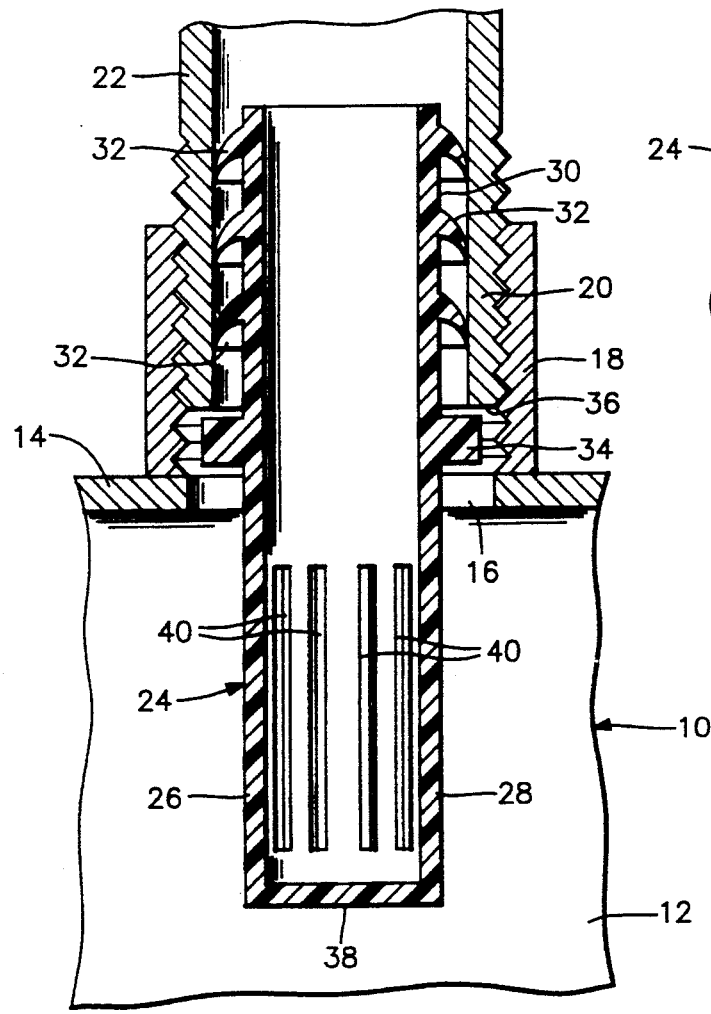
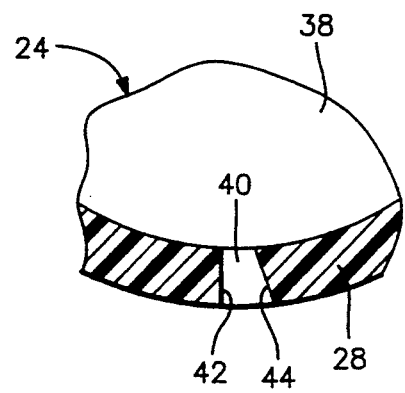
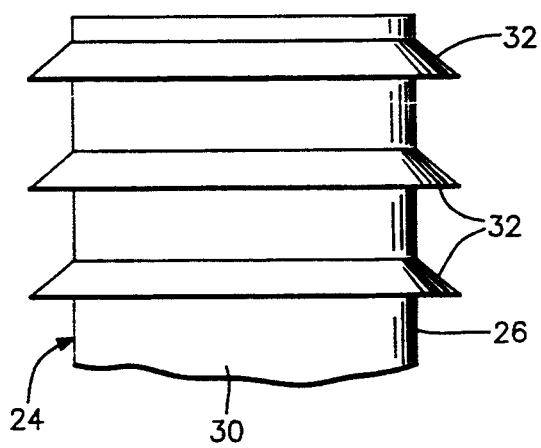
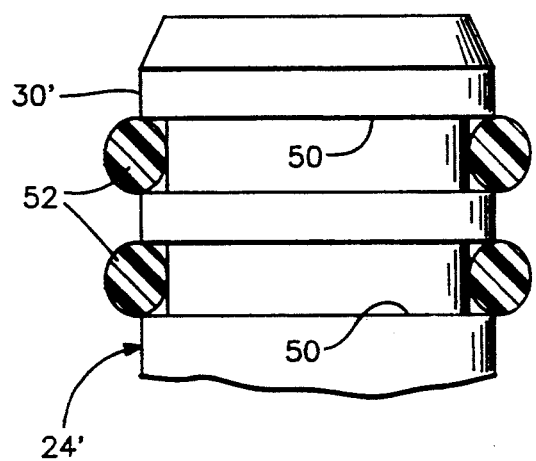

IRRIGATION SYSTEM LATERAL PICKUP PIPE STRAINER

BACKGROUND OF THE INVENTION

FIELD OF THE INVENTION

This invention relates to a vertical pickup pipe strainer for an irrigation system lateral line vertical inlet end branching upwardly from a horizontal main supply line. The strainer incorporates an elongated, upstanding tubular body and the upper end thereof is equipped with tandem arranged circumferentially extending seal structure and is upwardly telescopically engageable within the inlet of the lateral line with the lower end of the tubular body of the strainer projecting down into the horizontal main supply line. The lower inlet end of the strainer is equipped with a plurality of elongated, longitudinally extending radial slots at points spaced circumferentially thereabout and the slots have a substantially constant minimum transverse width of generally 0.025 inch.

DESCRIPTION OF RELATED ART

Various different forms of filters and other similar structures incorporating some of the general structural and operational features of the instant invention heretofore have been known. Examples of these previously known forms of filters are disclosed in U.S. Pat. Nos. 2,594,650, 2,907,466, 4,052,315, 4,331,293, 4,795,560 and 5,054,690.

However, these previously known forms of filtering devices do not include the overall combination of structural and operational features of the instant invention which particularly well adapted to be used as a filter for the inlet end of a branch line opening outwardly of a main irrigation pipe line.

SUMMARY OF THE INVENTION

A tubular filter body is provided including inlet and outlet end portions and a diametrically enlarged circumferential shoulder delimiting the inlet and outlet end portions. The outlet end portion is equipped with tandem circumferential seal structure and is upwardly telescopically engageable within the inlet of a lateral line branching upwardly from a horizontal main supply line of an irrigation system with the shoulder of the filter opposing the terminal end face of the lateral line inlet end. The inlet end portion of the tubular filter is closed at its terminus and includes elongated longitudinally extending and circumferentially spaced inlet slots having substantially constant minimum transverse width of generally 0.025 inch. Further, the slots taper inwardly toward the interior of the tubular filter and are operative to filter out material greater than 0.025 inch in width which might have a tendency to clog lateral line sprinkler or spray heads.

By having the slots taper in width inwardly toward the interior of the filter, any time the supply of water to the associated irrigation system is terminated and the dump valve on the far end of the main supply line is opened in order to discharge accumulated sediment therefrom, water within each lateral line extending upwardly from the main supply line will flow, by gravity, downwardly through the inlet end of the branch line and thus tend to backflow water through the slots of the filter in order to free the latter from any material trapped thereby.

The main object of this invention is to provide an irrigation system lateral line filter which may be readily installed within, removed from and replaced within the inlet end of an irrigation system lateral line.

Another object of this invention is to provide a filter in accordance with the preceding object and, after the associate lateral line has been disconnected, may be installed, removed and/or replaced independent of the use of tools.

Another very important object of this invention is to provide a filter for use in conjunction with irrigation system lateral lines having vertical inlet end portions and which may be effectively cleaned through the utilization of minimum backflow of water therethrough.

A further object of this invention is to provide a filter which is designed to operate efficiently while projecting laterally into a main water supply line.

A final object of this invention to be specifically enumerated herein is to provide a filter in accordance with the preceding objects and which will conform to conventional forms of manufacture, be of simple construction and easy so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary vertical sectional view of the intersection of the vertical inlet end of a lateral line opening downwardly through the top of a main supply line and with a first form of filter constructed in accordance with the present invention operatively associated with the inlet end of the lateral line;

FIG. 2 is an enlarged fragmentary horizontal sectional view of the inlet end portion of the filter illustrating the cross sectional shape of one of the radial slots formed therein;

FIG. 3 is a fragmentary enlarged elevational view of the upper end portion of the filter illustrated in FIG. 1 with the resilient sealing ribs thereon in their static positions; and FIG. 4 is an enlarged fragmentary elevational view similar to FIG. 3 but illustrating a modified form of the invention utilizing O-rings rather than the sealing ribs illustrated in FIGS. 1 and 3.

DESCRIPTION OF THE PREFERRED EMBODIMENT

Referring now more specifically to the drawings the numeral 10 generally designates an irrigation system which may be of the center pivot type or the wheel-roll type and includes an elongated, horizontal main supply line 12 having an upper wall portion 14 provided with an outlet opening 16 about which the lower end of an internally threaded mounting collar 18 is sealingly secured on the exterior of the upper wall portion 14.

Conventionally, the externally threaded lower end of an upstanding tubular nipple 22 is removably threaded downwardly into the mounting collar 18 and the tubular nipple extends upwardly from the collar 18 and has one of the legs of an inverted U-shaped lateral line removably and sealingly coupled thereto, the other leg of the inverted U-shape line having a downwardly facing spray head supported therefrom. Also, the tubular nipple 22 may comprise the lower end portion of a vertical riser topped by a spray head.

The inlet end of the main supply line 12 is of course connected to a source of water under pressure and the outlet end thereof is conventionally provided with a manually or automatically operated dump valve which may be opened briefly at desired intervals in order to allow the discharge of water therefrom to carry sediment and silt from the interior of the main supply line 12 which tends to collect in the end thereof remote from the inlet end.

The foregoing comprises a description of a conventional irrigation system. The improvement of the instant invention resides in the provision of a strainer to be mounted partially within the tubular nipple 22 and partially within the main supply line 12.

The strainer is generally referred to by the reference numeral 24 and includes an elongated, upstanding tubular body 26 including a lower inlet end portion 28 and an upper outlet end portion 30.

The upper outlet end portion 30 includes tandem arranged, axially spaced and circumferentially extending radially outwardly projecting seal ribs 32 and the body 26 is constructed of shape retentive plastic which is somewhat flexive and allows the seal ribs to be flexed radially inwardly and toward the lower inlet portion 28 from the static positions thereof illustrated in FIG. 3 to the flexed positions thereof illustrated in FIG. 1 as the upper outlet end portion 30 is upwardly telescoped into the interior of the tubular nipple 22.

The tubular body 26 includes a midlength circumferentially extending and radially outwardly projecting shoulder 34 delimiting the inlet and outlet end portions 28 and 30 and the shoulder 34 opposes and may abuttingly engage the end face 36 of the tubular nipple 22 in order to limit telescopic engagement of the upper outlet end portion 30 into the lower end of the tubular nipple 22. However, in most instances the frictional engagement of the seal ribs 32 with the internal surfaces of the tubular nipple 22 will maintain the upper outlet end portion 30 in position within the tubular nipple 22.

The lower inlet end portion 28 is closed at its lower end by an end wall 38 and includes circumferentially spaced elongated and longitudinally extending inlet slots 40 formed therein. As may be seen from FIG. 2, one side wall 42 of each slot 40 substantially coincides with a radial plane of the lower inlet end portion 28 and the other side wall 44 of each slot is inclined such that the inner longitudinal margins of the side walls 42 and 44 are spaced closer together than the outer longitudinal margins of the side walls 42 and 44.

The wall thickness of the inlet end portion 28 is generally 0.06 inch in thickness and the minimum transverse dimension of the slots 44 as defined between the inner longitudinal margins of the side walls 42 and 44 is generally 0.025 inch while the maximum transverse dimension of each slot 40 between the outer longitudinal margins of the side walls 42 and 44 is generally 0.05 inch.

The inward tapering of the slots 40 is quite important in that any grit or sediment larger than 0.025 inch in diameter and less than 0.05 inch in diameter will be trapped and build up within the slots 40. Any sediment or grit considerably larger than 0.05 inch will not be caught in the slots 40 and will either pass by each lower inlet end portion 28 or cling thereto about the slots 40 during operation of the irrigation system 10. However, any such larger grit that clings to the lower inlet end portions 28 during operation of the irrigation system 10 will fall by gravity from the lower inlet end portions 28 each time operation of the irrigation system is terminated. It is this larger grit that tends to buildup in the end of the main supply line 12 remote from the inlet end thereof and which is purged from the supply line 12 each time the dump valve is opened. In addition, if the main supply line 12 is provided with a control valve at the inlet end thereof and such control valve is closed as operation of the irrigation system is terminated, all of the tubular nipples 22 and the piping extending upward therefrom will remain full of water. If at this time the dump valve on the end of the main supply line remote from the inlet end thereof is opened, any grit caught in the inwardly tapering slots 40 will be backflushed therefrom as the water within the tubular nipples 22 and the piping thereabove flows back downwardly through the lower end portions 28. Thus, the strainers 24 may be intermittently cleaned.

It is also pointed out that the strainers 24 may be readily installed within an irrigation system merely by unthreading the tubular nipples 22 and upwardly telescoping the upper outlet end portions 30 of the strainers 24 into the lower ends of the tubular nipples 22 before reinstallation thereof.

With attention now invited more specifically to FIG. 4, a modified form of strainer is referred to in general by the reference numeral 24'. The strainer 24' includes a lower inlet end portion (now shown) which is substantially identical to the lower end portion 28, but the upper outlet end portion 30' thereof is provided with circumferentially extending grooves 50 in which O-ring seals 52 are seated, the O-ring seals 52 serving the same purpose as the seal ribs 32. Further, although the strainer 24 must be constructed of shape retentive plastic which is somewhat flexive in order to allow flexure of the seal ribs 32, the strainer 24' may be constructed of substantially rigid plastic.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with an irrigation system including a horizontal main supply line and a lateral line including an upstanding inlet end branching upwardly and outwardly of an upper wall portion of said main supply line and defining a downwardly facing end face at said inlet end, a strainer including an upstanding tubular body defining a lower inlet end portion and an upper outlet end portion as well as a diametrically enlarged circumferential shoulder centrally intermediate said upper and lower end portions, said upper end portion, throughout the length thereof, being appreciably smaller in diameter than said shoulder and including tandem circumferentially extending and radially outwardly projecting seal means thereon, said lower end portion including a plurality of circumferentially spaced inlet slots formed therein with each of said slots tapering in width toward the interior of said lower inlet end portion, said outlet end portion being telescoped upwardly into the interior of said lateral line inlet end with said seal means forming a substantially fluid tight seal between the interior of said lateral line inlet end and said upper end portion of said tubular body and said shoulder at least closely opposing said end face to define a limit stop for upward telescoping of said outlet end portion into said inlet end.

2. The combination of claim 1 wherein the outer width of said slots is generally 0.05 inch.

3. The combination of claim 1 wherein said tubular body is constructed of shape retentive but slightly flexive material, said multiple tandem circumferential seal means comprising radially outwardly projecting circumferential seal ribs formed integral with said body, tapering radially outwardly in thickness and at least slightly deflectable toward said inlet end of said tubular body.

4. The combination of claim 1 wherein said outlet end portion includes circumferential grooves formed therein at points spaced longitudinally therealong, said circumferential seal means comprising O-ring seals seated in and projecting at least slightly outwardly of said grooves.

* * * * *